June 19, 1923.

1,459,264

O. L. ROUTT

PROCESS OF MAKING WALL BOARD

Filed June 12, 1920

Orville L. Routt
INVENTOR.

BY

ATTORNEY.

Patented June 19, 1923.

1,459,264

UNITED STATES PATENT OFFICE.

ORVILLE L. ROUTT, OF LOS ANGELES, CALIFORNIA.

PROCESS OF MAKING WALL BOARD.

Application filed June 12, 1920. Serial No. 388,640.

*To all whom it may concern:*

Be it known that I, ORVILLE L. ROUTT, a citizen of the United States, residing in the city of Los Angeles, county of Los Angeles, and State of California, have invented certain new and useful Improvements in Processes of Making Wall Board, of which the following is a specification.

My invention relates to certain new and useful improvements in the process of making wall board and the like, and has for its principal object to overcome certain objections in the present methods, namely, to provide means for turning out wall board with smooth edges, thus eliminating the process of cutting the edge of the board, or leaving it rough and easily broken when a nail is driven therethrough too close to the edge.

Another object of my invention is to provide in the manufacture of wall board a surface sheet folded upon itself so as to provide edge coverings for the board as formed, after which part of the folded sheet can be easily cut, leaving the edge of the board covered with an upturned portion of the sheet and therefore making a smooth edge.

Another object of my invention is to make possible the manufacture of wall board having smooth finished surfaces with the cover sheets firmly secured to the body of the board without subjecting the board to a pressing operation other than the pressing action of the sizing or forming rollers. I have discovered by much experimental work that if the cover sheets are covered with a thin coating of plaster of Paris, in powdered form, while the sheet is perfectly dry, and just before it is rolled against the moist plastic material of which the core of the board is formed, that the moisture from said plastic material is sufficient to wet the powdered plaster of Paris, sprinkled on the sheets just before they are rolled on to the plastic material, and to cause said plaster of Paris to form an effective adhesive between the sheet and the plastic material or core of the board, and the pressure of the forming rollers causes the plaster of Paris to be pressed into the plastic material in such a way that a smooth surface is the result, and the sheet is securely adhered to the core, and the board comes from the forming rollers in fine finished form.

Another advantage of my improved process is that the plastic matter of which the core is formed can be made more moist and my dry powdered plaster of Paris will form the bond between the core and the sheet, whereas paper or other sheet covering will not adhere to a moist plastic material if it be too moist without some such adhesive to absorb the moisture. The advantage of using a very wet plastic material for the core is that when dry the board is lighter than when a drier plastic material is used.

In order to fully explain my new process for making wall board and the like, I have illustrated one simple arrangement of apparatus for practicing my invention. In the accompanying drawings,—

Figure 1:
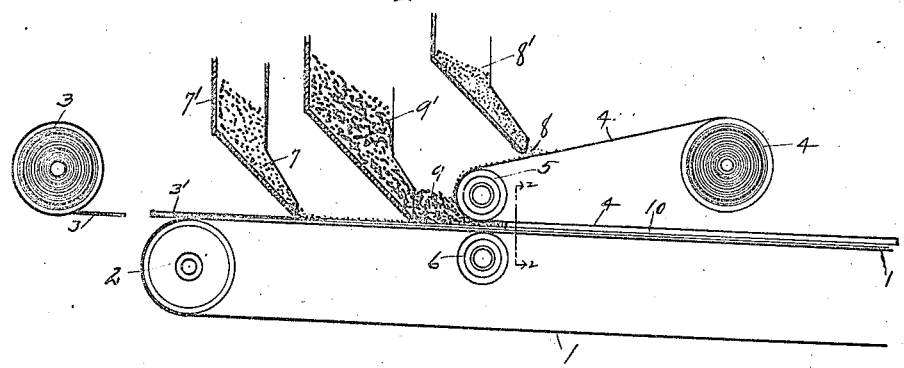
Figure 1 shows in combination certain instrumentalities for carrying out my improved process.
Figure 2:
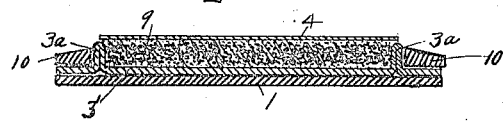
Figure 2 shows a cross sectional view though the wall board and the carrying belt and abutment pieces, taken on line 2—2 of Fig. 1.

Referring now more in detail to the drawings, 1 designates a carrying belt on which the wall board may be formed, said belt running around suitable pulleys, as 2. A roll of paper, or other sheet material, 3, is suitably supported at any convenient location and passes through a folding device (not shown) and is delivered to the carrying belt with two upturned folds, as $3^a$, $3^a$, near its opposite edges. A second roll of said sheet material 4 is also supported at any desired and convenient location, and is directed around a roller 5, positioned above the carrying belt and above the folded paper, 3', as indicated. A bearing roller, 6, is suitably supported directly under the roller 5, as shown, and over which the carrying belt 1 passes.

A suitable hopper, 7', is provided above the belt and folded sheet for feeding a powdered plaster of Paris, or other suitable dry adhesive on to the sheet, as indicated at 7. A similar hopper 8', is also provided for feeding said powdered adhesive, 8, on to the paper 4, as it passes to the roller 5, as clearly indicated.

The plastic material, 9, of which the core or body of the wall board is formed, is fed from a hopper 9', on to the folded sheet, 3', and between the upturned folds, $3^a$, $3^a$, thereof, as said paper passes with the belt 1, under the roller 5, and under the upper sheet 4, as shown. There is sufficient moisture in the plastic matter of which the core or body is formed to cause the dry powdered plaster of Paris to be converted into an adhesive between the opposite sides of the plastic matter and the sheets, and this plaster of Paris adhesive coat is also pressed into the plastic core and under the pressure of the forming rollers, 5 and 6, said board is turned out in finished form, with smooth surfaces and substantially dry surfaces, for the moisture from the opposite sides of the plastic matter 9, is taken up by the plaster of Paris and is utilized to convert it into an effective adhesive and at the same time prevents the covering sheets from getting moist enough to cause them to wrinkle or to peel when handled in a partly dry condition.

Figure 3:
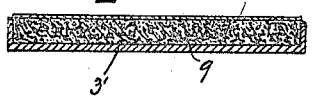
Figure 3 is a sectional view through the board as finished, with the outer edges of the folded sheet trimmed after the formation of the board.

The upturned folds of the sheet, 3ª, 3ª, form the edges of the wall board in a smooth manner, thus eliminating the objectionable rough edges and also the extra operation of cutting the edges of the board. Abutment strips, 10, 10, may be provided at opposite sides of the lower sheet, 3', to keep the folds from being forced outwardly by the plastic matter rolled thereon. After the board is formed, it is an easy matter to trim the outer part of the folded sheet with a knife and leave the finished board, as indicated in Fig. 3. An advantage of the outer portions of said sheet is that they overlie the carrying belt and any part of the plastic matter which gets beyond the folds falls on the sheet and is kept from the carrying belt. The folded portions are stronger than a single upturned edge of the sheet would be, and the matter of trimming the outer part of each fold is easily cared for.

Thus I have provided a new method of making wall board having smooth, finished edges as it comes from the apparatus, and also a wall board which has substantially dry surfaces as it comes from said apparatus, whereby the manufacture of said board has been completed except removing the excess moisture from the core, which is done in suitable dry kiln, or other well known ways of drying such articles.

I am aware that various kinds of apparatus can be devised for carrying out my new process without departing from the spirit of my invention, and I do not, therefore, limit my invention to the showing made except as I may be limited by the hereto appended claims.

I claim:

1. The process of making wall board which consists in advancing a strip of suitable material, supplying it with a coating of dry powdered adhesive matter, and then applying a plastic body forming substance thereto and rolling the same into a flat form, whereby moisture from said plastic substances acts on said dry adhesive and causes the same to operate as a binder for securing the strip of material to the body forming substance.

2. The process of making wall board and the like which consists in advancing strips of suitable material in close proximity to each other, supplying a coating of dry powdered adhesive matter to the inner surfaces of said sheets, and then supplying a plastic core-forming substance between said sheets and said coats of powdered adhesive matter and pressing the same into a flat homogeneous mass, whereby the strips of material adhere to the opposite sides of said article, substantially as described.

3. The process of making wall board and the like which consists in advancing strips of suitable material in close proximity to each other, with one of said sheets having upturned portions along its opposite sides, supplying a coating of adhesive matter to the inner surfaces of said sheets, and then supplying a plastic core-forming substance between said sheets and between said upturned portions, whereby said upturned portions form the edges of said wall board as said substance is pressed between said sheets.

4. The process of making wall board and the like which consists in advancing two sheets of suitable material to receive plastic matter therebetween, one sheet of said material having its opposite sides folded upon itself with the folded portions at substantially right angles to the plane of the sheet, and supplying a plastic matter between said advancing sheets and between the folded sides, the outer part of said folded portions being adapted to cut at the fold, substantially as indicated.

5. The herein described process of forming wall board which consists in advancing two sheets of paper in close proximity to each other one of said sheets having folded portions at opposite sides to form the opposite edges of the wall board, supplying a coating of dry powdered adhesive matter to the inner surface of each sheet, and then rolling therebetween a mass of plastic substance to which said sheets are secured by said adhesive matter, substantially as described.

Signed at Los Angeles, Los Angeles county, California, this 28 day of May, 1920.

ORVILLE L. ROUTT.

In presence of—
R. G. FLETCHER,
W. P. LITZENBERG.